June 25, 1929.  F. T. CARDARELLI ET AL  1,718,633
STITCHING DEVICE FOR TIRE BUILDING MACHINES
Filed Aug. 4, 1925
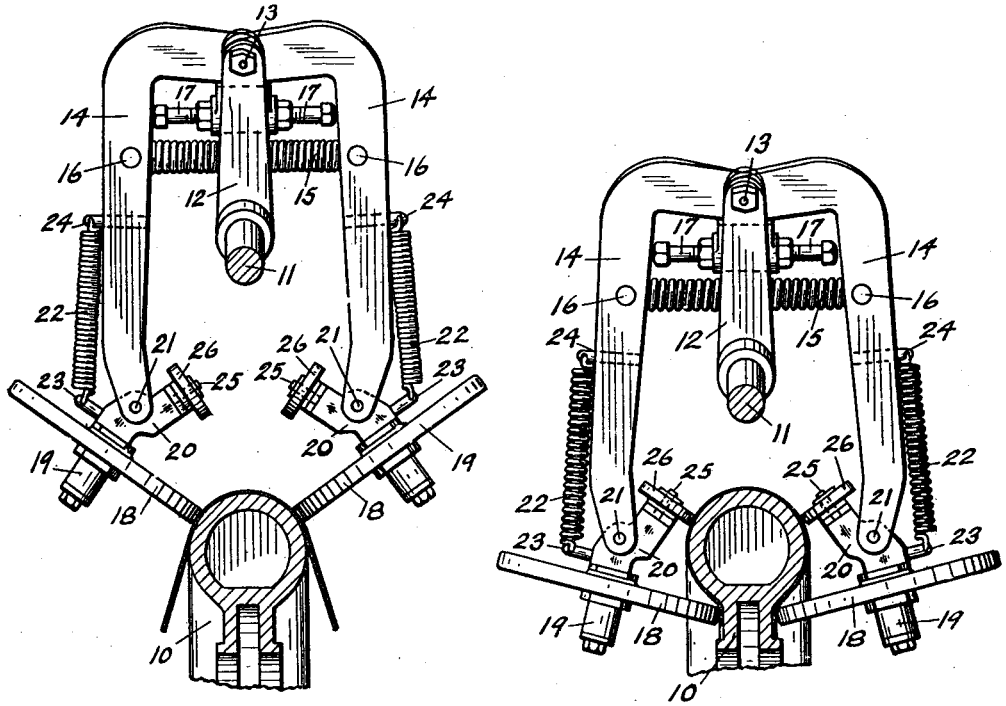
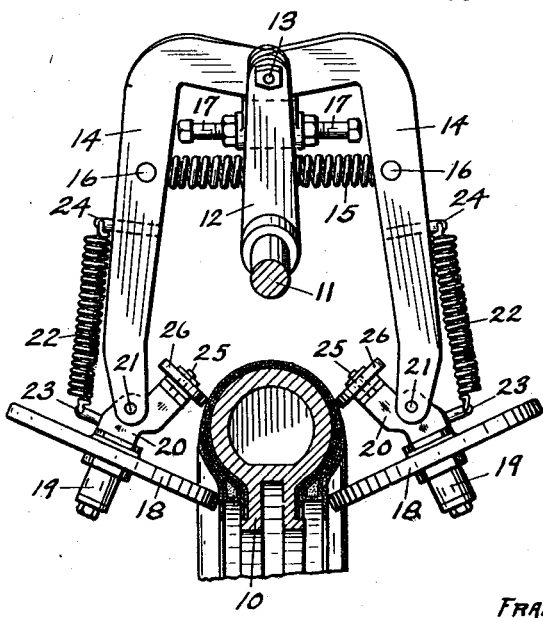
FIG.-1
FIG.-2
FIG.-3
INVENTOR.
FRANK T. CARDARELLI
ARTHUR LA BARRE
BY
ATTORNEY.

Patented June 25, 1929.

1,718,633

UNITED STATES PATENT OFFICE.

FRANK T. CARDARELLI AND ARTHUR LA BARRE, OF AKRON, OHIO, ASSIGNORS TO THE FIRESTONE TIRE AND RUBBER COMPANY, OF AKRON, OHIO, A CORPORATION OF OHIO.

STITCHING DEVICE FOR TIRE-BUILDING MACHINES.

Application filed August 4, 1925. Serial No. 48,064.

This invention relates to stitching devices for machines for building pneumatic tire casings.

The chief object of the invention is to provide an improved stitching device in which the stitching elements are adapted to be automatically adjusted to the proper angles and to be forced with considerable pressure against the inner portions of the core as they progress radially inwardly thereof. In particular the purpose of the invention is to provide means adapted to be actuated by engagement with the core to change the angularity of the stitchers, whereby the inner portions of the plies can be properly stitched in place, and to force the stitchers inwardly at these portions.

The foregoing and other objects are obtained by the construction illustrated in the accompanying drawings and described below. It is to be understood that the invention is not limited to the specific form thereof shown and described.

Of the accompanying drawings:

Figure 1 is an elevation of a stitcher device embodying the invention shown in the operation of stitching a ply on the core, the initial position of the stitchers being shown;

Figure 2 is a similar view showing the final position of the stitchers in stitching the ply on the core; and Figure 3 is a similar view showing the operation of stitching an outer ply of tire building material about the beads.

Referring to the drawings, 10 represents a tire building core of any known type and 11 represents a mounting for a stitcher device supported so as to be movable toward and from the periphery of said core in any suitable manner. On mounting 11 is secured a bracket arm 12 on which is pivoted at 13 a pair of stitcher arms 14, 14 extending toward opposite sides of core 10. Arms 14 are normally urged toward each other by a tensile spring 15 extending between pins 16, 16 on said arms and permitting the arms to spread as the stitchers are moved inwardly to the widest portion of the core, movement of the arms 14 toward each other being limited by adjustable stop screws 17, 17 threadedly mounted on arm 12.

The stitcher rollers 18, 18 are journaled on pins 19, 19 secured on brackets 20, 20 pivoted at 21, 21 on the free ends of arms 14, and adapted normally to be held substantially in the positions shown in Figure 1 by tensile springs 22, 22 extending between pins 23, 23 on brackets 20 and pins 24, 24 on arms 14.

Brackets 20 have journaled thereon on pins 25, 25, core-engaging rollers 26, 26 adapted to change the angularity of stitchers 18 with respect to core 10 against the action of springs 22 by engagement with the periphery of core 10 in the manner illustrated in Figures 2 and 3, the rollers 26 being so positioned as to engage the core substantially at the instant when the stitchers 18 have passed inwardly beyond the widest portion of the core over which they pass, so that subsequent inward movement of the stitching device will effect rotation of brackets 20 on arms 14 to adjust the stitchers to a better working angle adjacent the inner portions of the core and to urge the same against the core with considerable force to snugly stitch the plies about the beads.

In the building of tires, the inner plies are stretched over the core in any known manner and stitched into place in the manner illustrated in Figures 1 and 2. The beads are then applied and the outer plies stitched into place in a similar manner, the device being adapted to be actuated about the beads as illustrated in Figure 3.

It will be apparent from the foregoing that a simple and inexpensive device has been provided for effectively stitching plies of tire material about a core to form a carcass, and that the device requires no complicated mechanism for changing the angularity of the stitchers, this being effected by engagement of the device with the core, which latter serves to change the angularity of the stitchers in a theoretically correct manner since the outer portion of the core, which rollers 26 engage, is on the same minor radius as the inner portion thereof. The core, moreover, serves to urge the stitcher discs by rigid rather than yielding pressure against the inner portion of the core to snugly stitch the plies about the beads.

Modifications of the invention may be resorted to without departing from the spirit thereof or the scope of the appended claims.

What is claimed is:

1. In combination, a rotatable tire building core, and a stitching device movable toward and from the core, said device including a pair of arms movable toward and from each other, means normally urging the arms toward each other, brackets pivoted on the arms, stitchers mounted on the brackets, means normally holding the brackets in positions such that the stitchers will be yieldably angularly adjustable and will initially engage the core substantially in positions radially of the minor axis of the core, and rollers on the brackets spaced from the stitchers so as to engage the core only as the stitchers pass inwardly of the widest portion of the core, whereby further movement of the stitching device relatively inwardly of the core will cause said brackets to swing on the arms to change the angularity of the stitchers and to urge them with considerable force against the inner portions of the core.

2. In combination, a rotatable core and a stitching device, movable toward and from the core, said device including pivoted brackets carrying stitching rollers, the angularity of the stitching rollers with respect to the core normally being substantially constant until the stitcher reaches the widest part of the core, means permitting yielding angular movement of the stitchers until the latter reaches the widest part of the core, guide rollers mounted on said brackets and spaced from said stitching rollers so as to engage said core only when said stitchers pass the widest part thereof when moving inwardly of the core, and then to so swing said brackets as to force said stitchers against the inner portions of the core.

3. In combination, a rotatable core and a stitcher movable about the minor axis thereof in engagement with its surface, the angularity of the stitcher with respect to the core being normally constant until the stitcher reaches the widest part of the core, and means connected to the stitcher adapted to change the angularity of the stitcher after it passes the widest part of the core, said means including a follower adapted to ride on the surface of the core only when the stitcher is beyond the widest portion thereof.

FRANK T. CARDARELLI.
ARTHUR LA BARRE.